United States Patent Office 3,455,893
Patented July 15, 1969

3,455,893
PROCESS FOR HARDENING GELATINE BY REACTING WITH ACRYLIC ACID DERIVATIVES
Alfred Froehlich, Marly-le-Grand, Switzerland, assignor to Ciba Limited, Basel, Switzerland, a company of Switzerland
No Drawing. Filed Jan. 3, 1968, Ser. No. 695,361
Claims priority, application Switzerland, Jan. 5, 1967, 120/67
Int. Cl. C09h 5/00; G03c 1/30
U.S. Cl. 260—117                    10 Claims

ABSTRACT OF THE DISCLOSURE

The present invention relates to a process for hardening gelatine wherein gelatine is reacted with acrylic acid derivatives containing two H$_2$C=HC—OC—HN—CO—
           (NH—SO$_2$—NH—CO)$_{n-1}$— groups which are linked together by a bridge member and in which $n$ is 1 or 2. The gelatine preferably is hardened in the form of a photographic emulsion.

---

The present invention relates to the use of acrylic acid derivatives for use in the hardening of gelatine.

The present invention provides acrylic acid derivatives of the formula (I)

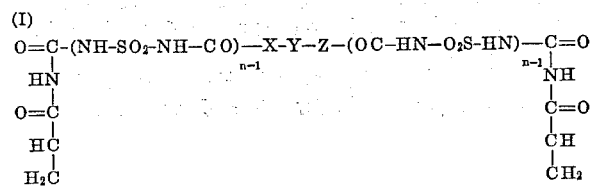

in which X and Z each represents an oxygen or a sulphur atom, an —NH— group or an —NH—CO— group linked through its carbon atom to Y, and Y represents a —(CH$_2$)$_m$— group, a —CH$_2$—CH$_2$— [O—CH$_2$—CH$_2$]$_q$ group, a —(CH$_2$)$_r$—O—(CH$_2$)$_r$ group or a —(CH$_2$)$_r$—S—(CH$_2$)$_r$ group, and Y may also represent a direct bond or a —CO— group when both X and Z are —NH— groups and $n=1$; $n$, $m$, $r$ and $q$ are integers and $n=0$, 1 or 2, $m=$at most 14, $q=2,3$ or 4, and $r$ is at most 4.

The residues X and Z may be identical or different and may be linked with the H$_2$C=HC—OC—HN—CO— groups either directly ($n=1$) or through

—NH—SO$_2$—NH—CO— groups ($n=2$). The scheme of formulae set forth below shows the ways in which the residues X, Y and Z may be combined.

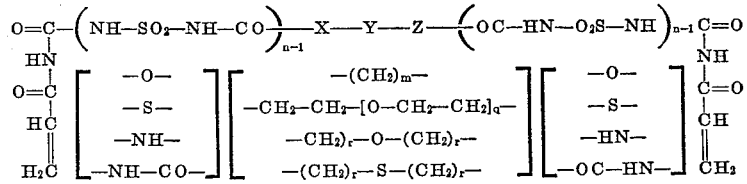

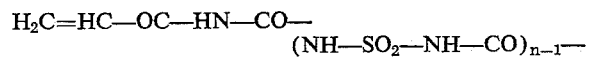

Of special importance are the acrylic acid derivatives of the formula

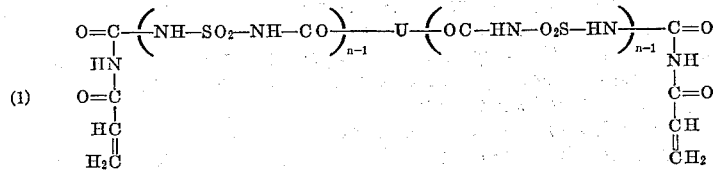
(1)

in which U represents one of the residues —O—Y$_1$—O—, —X—)CH$_2$)$_m$—Z—or, when $n=1$, —NH—(CO)$_{s-1}$—NH where Y$_1$ is one of the groups —(CH$_2$)$_m$—,
             —CH$_2$CH$_2$—[O—CH$_2$CH$_2$]$_q$—,
—(CH$_2$)$_r$—O—(CH$_2$)$_r$— or —(CH$_2$)$_r$—S—(CH$_2$)$_r$—
where $s=1$ or 2 and X, Z, $m$, $n$, $q$ and $r$ have the meanings given above.

Of special interest are acrylic acid derivatives of the formula

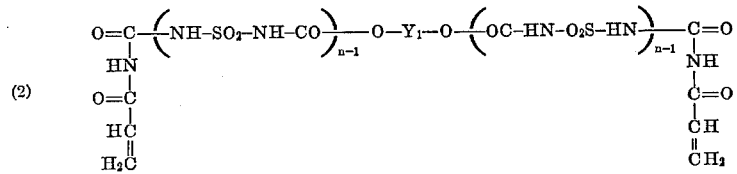
(2)

in which $Y_1$ is one of the groups $—(CH_2)_{m_1}—$, $$—CH_2—CH_2—[O—CH_2—CH_2]_q—$$

$—(CH_2)_{r_1}—O—(CH_2)_{r_1}$ or $—(CH_2)_{r_1}—S—(CH_2)_{r_1}—$ where $n$, $m_1$, $q$, $r_1$ are integers and $n=1$ or $2$, $m_1$ at least 2 and at most 12, and $q$ or $r$ are each 2, 3 or 4.

Because they can be obtained easily, the compounds of the following formulae are preferred:

(9) $R_1—HN—(CH_2)_{m_1}—NH—R_1$  $m_1=2$ to 12
(10) $R_1—O—(CH_2)_{m_2}—NH—R_1$  $m_2=2$ to 4
(11) $R_1—NH—OC—(CH_2)_m—CO—HN—R_1$
$m=1$ to 14
(12) $R_1—HN—NH—R_1$
(12a) $R_1—O—(CH_2)_{m_1}—O—R_1$  $m_1=2$ to 12
(13) $R_1—S—CH_2—CH_2—S—R_1$

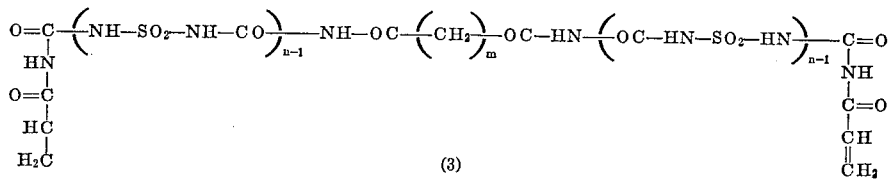

(3)

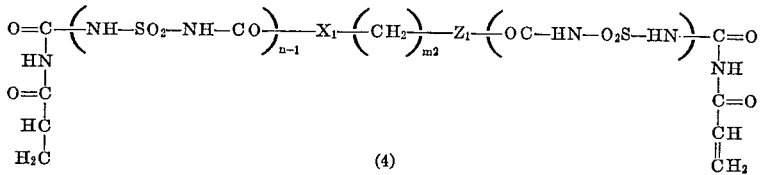

(4)

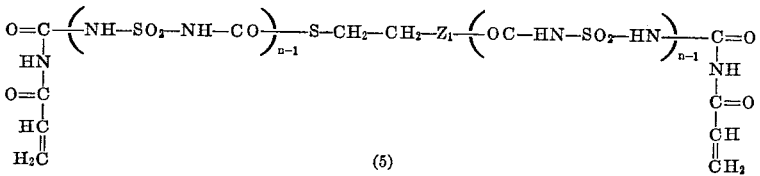

(5)

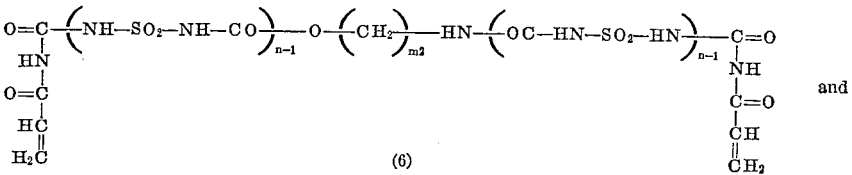

(6)

and

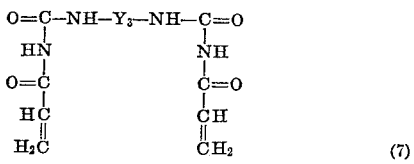

(7)

In the Formulae 3 to 7 $Y_3$ represents a $—CO—$ group or a $—(CH_2)_{m_3-1}—$ group ($m_3$ being an integer not greater than 13), $X_1$ represent an oxygen or a sulphur atom or an $—NH—$ group, $Z_1$ a sulphur or an oxygen atom, and $n$, $m$ and $m_2$ are integers, $m$ is at most 14 and $m_2$ is 2, 3 or 4, and $n$ is at most 2.

The following groups of compounds and individual compounds (in these formulae $R_1$ represents an $H_2C=HC—CO—HN—CO—$ residue and $R_2$ and $—NH—SO_2—NH—CO—$ residue) are especially mentioned:

(A) Compounds of the Formula I, in which $n=1$:

(8) $R_1—O—CH_2—CH_2—[O—CH_2—CH_2]_{q_1}—O—R_1$
$q_1=1$ to 4

(14) $R_1—O—CH_2—CH_2—S—R_1$
(15) $R_1—O—CH_2—CH_2—S—CH_2—CH_2—O—R_1$.

Compounds of the Formulae 117 and 119.

(B) Compounds of the Formula I, in which $n=2$:

(16) $R_1—R_2—O—(CH_2)_m—O—R_2—R_1$
$m_1=2$ to 12
(17) $R_1—R_2—O—CH_2—CH_2—[O—CH_2—CH_2]_{q_1}$
$—O—R_2—R_1$  $q_1=1$ to 4
(18) $R_1—R_2—HN—(CH_2)_{m_1}—NH—R_2—R_1$
$m_1=2$ to 12
(19) $R_1—R_2—NH—OC—(CH_2)_m—CO—HN—R_2—R_1$
$m=1$ to 14
(20) $R_1—R_2—HN—(CH_2)_{m_2}—O—R_2—R_1$
$m_2=2$ to 4

The present invention also provides a process for preparing the acrylic acid derivatives of the above Formula I, which comprises:

(a) Eliminating 2 hydrogen halide molecules from a β-halogenopropionic acid derivative of the formula

II.

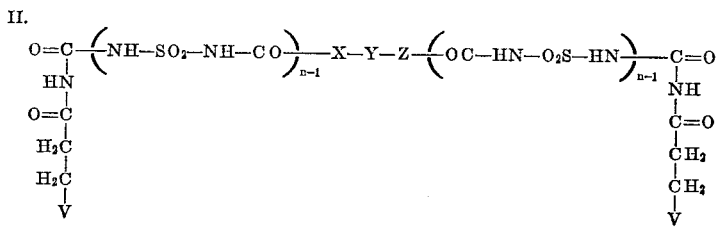

(in which X, Y and Z have the meanings given above and V represents a chlorine or bromine atom); or (b) When $n$ is 2 in the above Formula I reacting an acryloyl-carbamoyl-aminosulphonylisocyanate of the formula (III) $\quad H_2C=HC-OC-HN-OC-NH-SO_2-N=C=O$ in a molecular ratio of 2:1 with a compound of the formula (IV) $\quad H-X-Y-Z-H$ in which X, Y and Z have the meanings given above.

The compounds of the Formula II required as starting materials may be obtained by reacting a compound of the formula (V) $\quad VH_2C-H_2C-OC(-HN-CO-NH-SO_2)_{n-1}-N=C=O$ with a compound of the Formula IV. Compounds of the Formula V, in which $n=2$, may be obtained by monolateral addition of β-chloro- or β-bromopropionic acid amide to sulphonyldiisocyanate. Similarly, the compound of the Formula III may be obtained by monolateral addition of acrylic acid amide to sulphonyldiisocyanate. For the manufacture of compounds of the Formula I by these methods, the bifunctional compounds of the Formula IV are required indirectly or directly in each case. The preferred compounds of the Formula IV correspond to the equivalent residues of the Formulae 1 to 20. As can be seen, these compound are, for example, dihydroxy compounds, diamines, dithiols, dicarboxylic acid diamides or aminoalcohols. As examples the following bifunctional compounds may be mentioned; ethylene-glycol, diethyleneglycol, tri-, tetra- and penta- ethylene-glycol, hexamethyleneglycol, decane - 1,10 - diol, γ,γ′-dihydroxydipropyl ether, 2-aminoethanol-(1), 3-aminopropanol-(1), 1-(aminobutanol-(4), 1-mercaptoethanol-(2), thiodiglycol, γ,γ′-dihydroxypropylsulphide, ethylenediamine, hexamethylenediame, malonic acid diamide, adipic acid diamide, sebacic acid diamide, hexadecane-dicarboxylic acid diamide, diglycollic acid diamide, thiodihydracrylic acid diamide, urea and hydrazine.

The compounds of the Formula I may be used for hardening gelatine, especially photographic gelatine layers. Apart from this they may be used, for example, as crosslinking agents in the textile and leather industries, in the manufacture of paper and in the plastics, glue and gelatine industry.

Accordingly, the present invention includes also a process for hardening gelatine, wherein a compound of the Formula I is used. The vinyl groups of these compounds may react with the hydroxyl, mercapto, amino or imino groups of gelatine.

Preferred hardening agents for gelatine are compounds of the formula

(21) $\quad H_2C=HC-OC-NH-OC-O-Y_2-O-CO-NH-CO-CH=CH_2$ in which $Y_2$ represents a $-CH_2-CH_2-$ or $-CH_2-CH_2-[O-CH_2-CH_2]_{q_1}$ group (where $q_1$ is an integer of from 1 to 4) or a $-CH_2-CH_2-S-CH_2-CH_2-$ group; or compounds of the formula (22)

$O=C-NH-SO_2-NH-CO-O-Y_2-O-OC-HN-SO_2-HN-C=O$
$\quad\ \ |\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ |$
$\quad\ HN\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ NH$
$\quad\ \ |\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ |$
$\quad\ O=C\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ C=O$
$\quad\ \ |\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ |$
$\quad\ HC\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ CH$
$\quad\ \ ||\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ ||$
$\quad\ H_2C\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ CH_2$ in which $Y_2$ is one of the groups $-(CH_2)_{m_1}-$, $-CH_2-CH_2-[O-CH_2-CH_2]_{q_1}$ or $-CH_2-CH_2-S-CH_2-CH_2-$, where $m_1$ and $q_1$ are integers, $m_1$ is within the range of from 2 to 12 and $q_1$ within the range of from 1 to 4; or compounds of the formula

(23) $\quad H_2C=HC-OC-NH-OC-O-(CH_2)_{m_2}-NH-CO-HN-CO-CH=CH_2$ in which $m_2=2, 3,$ or 4; or compounds of the formula

(24) $\quad H_2C=CH-OC-NH-OC-HN-NH-CO-HN-CO-CH=CH_2$ or of the formula (25)

$O=C-NH-SO_2-NH-CO-O-CH_2-CH_2-Z_1-OC-HN-O_2S-HN-C=O$
$\quad\ |\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ |$
$\ HN\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ NH$
$\quad\ |\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ |$
$\ O=C\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ C=O$
$\quad\ |\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ |$
$\ HC\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ CH$
$\quad\ ||\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ ||$
$\ H_2C\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ CH_2$ in which $Z_1$ is an oxygen or a sulphur atom; and compounds of the formula (26)

$O=C-NH-(CH_2)_{m_4}-HN-C=O$
$\quad\ |\ \ \ \ \ \ \ \ \ \ \ \ \ \ \ \ \ \ \ \ \ \ \ \ \ \ \ \ \ \ \ \ \ \ \ \ |$
$\ HN\ \ \ \ \ \ \ \ \ \ \ \ \ \ \ \ \ \ \ \ \ \ \ \ \ \ \ \ \ \ \ \ NH$
$\quad\ |\ \ \ \ \ \ \ \ \ \ \ \ \ \ \ \ \ \ \ \ \ \ \ \ \ \ \ \ \ \ \ \ \ \ \ \ |$
$\ O=C\ \ \ \ \ \ \ \ \ \ \ \ \ \ \ \ \ \ \ \ \ \ \ \ \ \ \ \ \ \ C=O$
$\quad\ |\ \ \ \ \ \ \ \ \ \ \ \ \ \ \ \ \ \ \ \ \ \ \ \ \ \ \ \ \ \ \ \ \ \ \ \ |$
$\ HC\ \ \ \ \ \ \ \ \ \ \ \ \ \ \ \ \ \ \ \ \ \ \ \ \ \ \ \ \ \ \ \ CH$
$\quad\ ||\ \ \ \ \ \ \ \ \ \ \ \ \ \ \ \ \ \ \ \ \ \ \ \ \ \ \ \ \ \ \ \ \ \ \ ||$
$\ H_2C\ \ \ \ \ \ \ \ \ \ \ \ \ \ \ \ \ \ \ \ \ \ \ \ \ \ \ \ \ CH_2$ in which $m_4$ is an integer of from 2 to 10.

If it is desired that the curing agent should diffuse out of the gelatine only with difficulty, it is of advantage to use those compounds of the Formula I in which the residue Y is an aliphatic chain of at least 6 carbon atoms, and the members of this chain may be exclusively carbon atoms or the chain may contain some hetero atoms, for example, nitrogen, sulphur or especially oxygen bridges. It is preferable for the chain to contain a predominant number of carbon atoms, thus the corresponding compounds of the Formula I are preferred. As representatives of these groups of compounds there may be mentioned those of the Formulae 102, 103, 105, 108b, 109, 117 and 118.

The reaction of gelatin with a compound of the Formula I generally proceeds easily and in the usual manner. As a rule the compounds per se as well as the sodium salts are water-soluble or readily soluble in water-soluble organic solvents, for example, methanol, ethanol, dimethylformamide and are added to the gelatine, for example, as solutions of 2.5 to 10% strength. For example, a solution of the hardening agent in water, ethanol, methanol or dimethylformamide may be combined at room temperature or a slightly higher temperature with gelatin and the gelatin—which may contain silver halide and/or other substances for the production of photographic images, poured as a layer over a support in the usual manner and allowed to dry. The amount of hardening agent, referred to the amount of dry gelatin, is advantageously within the range of 0.5 to 5%. The hardening of gelatine by these compounds, seems to be based on an extensive crosslinking process. The hardening affects neither the photographic properties of the photosensitive layers nor the reactivity of colour couplers or dyes. The pH value and the viscosity of the gelatine hardened with the agents of this invention remain substantially intact. It is a special advantage of the new hardening agents that even when used in a low concentration they harden the gelatin layers sufficiently within 18 to 24 hours so that the cast layers can be tested immediately after having been cast by processing specimens even at a higher temperature or in aggressive processing baths. The new hardening agents are all storable. Moreover, the compounds of the Formula I have the advantage that they do not change the pH value of the emulsion during the hardening operation.

When used as hardening agents for gelatine in photographic layers the compounds of this invention offer further advantages. The hydrophilic groups of which the molecule contains several and in a chain-like arrangement make them a flux for the photographic emulsions which has a beneficial effect upon the casting property. However, it is a special advantage that the long-chain substances among the compounds of this invention, for example, those of the Formulae 102, 103, 105, 108b, 109, 117 and 118, are diffusion resistant when used in photographic layers. In the manufacture of multi-layer materials this property offers decisive advantages. It is known that when several layers are cast, either wet-on-solidified or wet-on-dry, the hardening agent always diffuses from the top layer into the underlying layers so that the bottom layers are hardened more strongly than the higher ones. The result of such a differential hardening is the detaching of layers or the formation of a wrinkled grain when these materials are being developed. The use of hardening agents that diffuse only with difficulty according to the present invention prevents this harmful migration of the hardening agent in a multi-layer material. Conversely, the difficultly diffusing compounds to be used according to this invention allow of individual hardening of each individual layer by a suitable differential calibration of the amount of hardener, which is very important in the manufacture of multi-layer materials. It is also known that dyes or dye formers have a different lowering effect upon the melting point of the gelatine layers. A suitable increase in the amount of hardener added compensates these differences. The substantially non-diffusing hardeners also make it possible to harden the protective top coat more strongly than the emulsion layers underneath it without affecting the hardening of the latter. These diffusion-resistant hardeners are also specially suitable for hardening layers in the vicinity of other layers that are not to be hardened. The effect and the test method for such difficultly diffusing hardeners are shown in Example 1.

In the following Manufacturing Instructions and examples the percentages are by weight, and in the formulae $R_1$ represents the residue $H_2C=HC—OC—NH—CO—$ and $R_2$ the residue $—NH—SO_2—NH—CO—$.

MANUFACTURING INSTRUCTIONS (A) A solution of 7.1 g. of acrylamide in 110 ml. of absolute acetontrile is dropped at −10° C. into a solution of 14.8 g. of sulphonyldiisocyanate in 170 ml. of absolute ether. The batch is stirred on overnight at room temperature and then, while cooling with ice, 3.1 g. of ethyleneglycol are dropped in and the whole is stirred for another 12 hours at room temperature. After a short time the compound of the formula (101)    $R_1—R_2—O—CH_2—CH_2—O—R_2—R_1$ begins to settle out in the form of colourless crystals. It is suctioned off, washed with ether and yields 21 g. of colourless crystals which decompose at 215 to 220° C.

*Analysis.*—$C_{12}H_{16}N_6O_{12}S_2$. Calculated: C, 28.81; H, 3.21; N, 16.81; S, 12.82. Found: C, 28.95; H, 3.6; N, 16.71; S, 12.62.

(B) 14.8 grams of sulphonyldiisocyanate are reacted with acrylamide as described under (A), and then a solution of 2.95 g. of hexamethyleneglycol in 10 ml. of acetonitrile is dropped in. The whole is stirred for 12 hours at room temperature, suctioned and washed with ether. The residue is dissolved at 40° C. in a small quantity of dimethylformamide, mixed with 3 times its own volume of methanol, filtered and washed with 100 ml. of water to yield 7.55 g. of colourless crystals of the compound of the formula (102)    $R_1—R_2—O—(CH_2)_6—O—R_2—R_1$ which decomposes at 163° C.

*Analysis.*—$C_{16}H_{24}N_6O_{12}S_2$. Calculated: C, 34.53; H, 4.35; N, 15.10; S, 11.52. Found: C, 34.72; H, 4.70; N, 15.40; S, 11.30.

(C) A solution of 29.6 g. of sulphonyldiisocyanate in 340 ml. of absolute ether is mixed at −10° C. with a solution of 14.2 g. of acrylamide in 220 ml. of acetonitrile. The batch is stirred for 8 hours at room temperature and then a solution of 17.4 g. of 1,10-decanediol in 100 ml. of acetonitrile is dropped in. The batch is stirred overnight, suctioned and washed with ether to yield 60.7 g. of the compound of the formula (103)    $R_1—R_2—O—(CH_2)_{10}—O—R_2—R_1$ in the form of colourless crystals, which decompose at 148° C.

*Analysis.*—$C_{20}H_{32}N_6O_{12}S_2$. Calculated: C, 39.20; H, 5.22; N, 13.70; S, 10.43. Found: C, 39.2; H, 5.4; N, 13.7; S, 10.2.

(D) 29.6 grams of sulphonyldiisocyanate are reacted with acrylamide as described under (C) and then, while cooling with ice, a solution of 10.6 g. of diethyleneglycol in 50 ml. of absolute acetonitrile is dropped in. The batch is stirred for 12 hours at room temperature, suctioned, and after washing with ether there are obtained 50 g. of the compound of the formula (104)    $R_1—R_2—O—(CH_2—CH_2—O)_2—R_2—R_1$ in the form of colourless crystals which decompose at 117° C. After one recrystallization from alcohol the compound decomposes at 136° C.

*Analysis.*—$C_{24}H_{25}O_{13}N_6S_2$. Calculated: C, 30.88; H, 3.70; N, 15.44 S, 11.78. Found: C, 30.8; H, 3.8; N, 15.3; S, 11.8.

(E) 14.8 grams of sulphonyldisocyanate are reacted with 7.1 g. of acrylamide as described under (A) and then, while cooling with ice, a solution of 7.5 g. of triethyleneglycol in 50 ml. of absolute acetonitrile is dropped in. The batch is stirred for 12 hours, suctioned and washed with ether to yield 26 g. of colourless crystals. The point of decomposition of the resulting compound of the formula (105)    $R_1—R_2—O—(CH_2—CH_2—O)_3—R_2—R_1$ is unsharp and depends on the speed of heating.

*Analysis.*—$C_{16}H_{24}N_6O_{14}S_2$. Calculated: C, 32.65; H, 4.11; N, 14.28; S, 10.90. Found: C, 32.7; H, 4.1; N, 14.1; S, 10.9.

(F) 29.6 g. of sulphonyldiisocyanate are reacted with acrylamide as described under (D), then 10 g. of finely powdered malonic acid diamide are added and the whole is stirred for 12 hours, suctioned and washed with acetonitrile and ether, to yield 30 g. of colourless crystals which decompose at 160° C. These crystals are triturated with alcohol, then heated to 70° C., suctioned off and washed with alcohol. The residue is dissolved in 150 ml. of water at pH=7, filtered, the mother liquor rendered acid to Congo red with HCl suctioned off and the residue washed with water and dried under vacuum at 40° C. to yield 21 g. of the compound of the formula (106)    $R_1—R_2—NH—CO—CH_2—OC—HN—R_2—R_1$ in the form of colourless crystals which decompose at about 220° C.

*Analysis.*—$C_{13}H_{16}O_{12}N_6S_2$. Calculated: C, 28.89; H, 2.98; N, 20.73; S, 11.67. Found: C, 29.3; H, 3.3; N, 21.0; S, 11.3.

(G) A solution of 3.55 g. of acrylamide in 55 ml. of absolute acetonitrile is dropped with stirring at −10° C. into a solution of 7.4 g. of sulphonyldiisocyanate in 85 ml. of absolute ether. The batch is stirred on for 12 hours at room temperature, cooled to 0° C., mixed at this temperature with a solution of 29 g. of adipic acid diamide in 29 ml. of trifluoroacetic acid and the batch is stirred on for 24 hours at room temperature, then suctioned, washed with ether, the residue is dissolved at 40° C. in 30 ml. of dimethylformamide, filtered, and the filtrate mixed with 100 ml. of methanol, cooled, suctioned and the residue is washed with methanol and ether to yield 5.5 g. of the compound of the formula (107) $R_1$—$R_2$—NH—CO—$(CH_2)_4$—OC—HN—$R_2$—$R_1$ in the form of colourless crystals which decompose at 179° C.

Analysis.—$C_{16}H_{22}O_{12}N_6S_2$. Calculated: C, 30.12; H, 3.94; N, 20.07; S, 11.48. Found: C, 30.35; H, 3.47; N, 19.80; S, 11.20.

(H) A solution of 2 g. of 1,6-diaminohexane in 40 ml. of absolute ether is cooled to —10° C. and at this temperature is solution of 4.05 g. of 3-chloropropionylisocyanate in 20 ml. of ether is dropped in. The batch is stirred for 5 hours longer, diluted with 30 ml. of ether, suctioned and washed with ether. The residue is dissolved at the boil in 100 ml. of glacial acetic acid and filtered. The compound of the formula (108a)

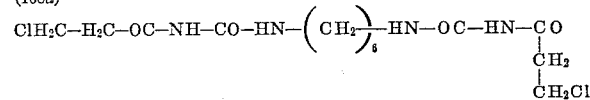

is allowed to crystallize out slowly, then suctioned off and washed with ether to yield 3.5 g. of colourless crystals melting at 204° C.

Analysis.—$C_{14}H_{24}N_4O_4Cl_2$. Calculated: C, 43.87; H, 6.31; N, 14.62. Found: C, 44.0; H, 6.48; N, 14.61.

3.83 grams of this product are dissolved in a mixture of 20 ml. of dimethylsulphoxide and 10 ml. of dimethylformamide and a solution of 2.5 g. of triethylamine in 10 ml. of absolute ether is dropped in at room temperature. The whole is stirred for 12 hours at room temperature, suctioned and the residue is washed with ether. Recrystallization from alcohol furnishes 2.1 g. of the compound of the formula (108b)     $R_1$—NH—$(CH_2)_6$—HN—$R_1$ in the form of colourless crystals melting at 160° C.

Analysis.—$C_{14}H_{22}N_4O_4$. Calculated: C, 54.18; H, 7.15; N, 18.04. Found: C, 53.95; H, 7.30; N, 18.00.

(I) While cooling a solution of 19.4 g. of tetraethyleneglycol in 100 ml. of acetonitrile with ice it is mixed with a solution of 27 g. of β-chloropropionylisocyanate in 100 ml. of absolute ether. The batch is stirred for 24 hours at room temperature, suctioned, the residue washed with ether and recrystallized from 150 ml. of methanol to yield 38 g. of colourless crystals melting at 89° C.

Analysis.—$C_{16}H_{26}N_2O_9Cl_2$. Calculated: C, 41.66; H, 5.64; N, 6.07; Cl, 15.41. Found: C, 41.3; H, 5.7; N, 6.1; Cl, 15.5.

A mixture of 4.6 g. of the resulting product, 100 ml. of absolute acetone and 3 ml. of triethylamine is stirred overnight and suctioned, to leave as residue 2.5 g. of triethylamine hydrochloride. The mother liquor is evaporated under vacuum at 35° C. and the residual oil covered with 20 ml. of ether, and after the whole has been standing for 2 to 3 hours, crystallization sets in. The crystals are suctioned off, washed with ether and recrystallized from 5 ml. of acetone to yield the compound of the formula (109) $R_1$—O—$CH_2$—$CH_2$—(O—$CH_2$—$CH_2$)$_3$—O—$R_1$ in the form of colourless crystals which melt unsharply at 53 to 57° C. and are readily soluble in methanol, water and acetone.

Analysis.—$C_{16}H_{24}N_2O_9$. Calculated: C, 49.49; H, 6.19; N, 7.22. Found: C, 50.3; H, 6.0; N, 7.1.

(J) 5 grams of hydrazine hydrate (of 100% purity) are stirred in 150 ml. of acetonitrile. A solution of 41 g. of chloropropionylisocyanate in 50 ml. of acetonitrile is dropped in at —5° C. The batch is stirred for 5 hours at room temperature, suctioned and the residue washed with ether, to yield 26 g. of a white powder which is dissolved at 100° C. in 60 ml. of dimethylformamide. 5 grams of active carbon are stirred into this solution at 100° C., the whole is suctioned while still hot and the mother liquor mixed with 100 ml. of methanol, cooled to 0° C., suctioned and the residue washed with methanol and ether to yield 22 g. of colourless crystals which decompose at 186° C.

Analysis.—$C_8H_{12}N_4O_4Cl_2$. Calculated: C, 32.11; H, 4.01; N, 18.73; Cl, 23.75. Found: C, 32.31; H, 4.25; N, 18.60; Cl, 23.75.

3 grams of this substance are heated and dissolved in 10 ml. of dimethylformamide, then cooled and while cooling with ice 2.5 g. of triethylamine are stirred in. The batch is stirred for 12 hours at room temperature, 50 ml. of ether are added, the whole is suctioned and washed with ether. The residue is triturated with 20 ml. of water, washed with water and dried under vacuum at 40° C. Recrystallization from 10 ml. of dimethylformamide yields 1.2 g. of the compound of the formula (110)     $R_1$—HN—NH—$R_1$ in the form of colourless crystals which decompose at 236–238° C.

Analysis.—$C_8H_{10}N_4O_4$. Calculated: C, 42.48; H, 4.46; N, 24.77. Found: C, 42.30; H, 4.44; N, 24.59.

(K) a solution of 6.1 g. of ethanolamine in 100 ml. of absolute acetonitrile is mixed at —5° C. dropwise with a solution of 26.8 g. of chloropropionylisocyanate in 50 ml. of acetone. The batch is stirred for 12 hours at room temperature, suctioned and the residue is washed with ether and crystallized from 700 ml. of water+alcohol 1:9 and 1 g. of carbon to yield 12.4 g. of colourless crystals melting at 162° C.

Analysis.—$C_{10}H_{14}N_3O_5Cl_2$. Calculated: C, 36.60; H, 4.61; N, 12.81; Cl, 21.60. Found: C, 36.67; H, 4.58; N, 13.03; Cl, 21.30.

A suspension of 3.28 g. of the resulting substance in 50 ml. of absolute acetone is mixed at —5° C. with 2.5 g. of triethylamine. The batch is stirred for 24 hours at room temperature and the precipitated triethylamine hydrochloride is suctioned off. The mother liquor is distilled under vacuum at a bath temperature of 30° C. and the residue crystallized from water to yield 1.8 g. of colourless crystals of the compound of the formula (111)     $R_1$—O—$CH_2$—$CH_2$—HN—$R_1$ melting at 167° C.

Analysis.—$C_{10}H_{12}O_5N_3$. Calculated: C, 46.06; H, 5.13; N, 16.46. Found: C, 46.37; H, 4.96; N, 16.39.

(L) a mixture of 7.3 g. of adipic acid diamide and 15 g. of β-chloropropionylisocyanate is slowly heated to 100 to 110° C. The reaction begins at this temperature; the heating is removed and the temperature is maintained at a maximum of 120° C. by means of external cooling. On completion of the reaction the batch is boiled with 50 ml. of acetone, suctioned and the residue washed with acetone and recrystallized to yield 14.5 g. of colourless crystals melting at 175° C.

Analysis.—$C_{14}H_{20}N_4O_6Cl_6$. Calculated: C, 40.09; H, 4.90; N, 13.62; Cl, 17.24. Found: C, 40.07; H, 5.00; N, 13.70; Cl, 16.90.

4.1 grams of the resulting product are dissolved at 40 to 50° C. in 20 ml. of dimethylformamide, then cooled to 10° C. and at this temperature 2.5 g. of triethylamine are dropped in. The batch is stirred for 12 hours, then diluted with 50 ml. of ether, suctioned and the residue is washed with methanol and then with water and dried at 40° C. under vacuum to yield 2.9 g. of colourless crystals of the compound of the formula (112) $R_1$—NH—OC—$(CH_2)_4$—CO—HN—$R_1$ which, after recrystallization from glacial acetic acid, decompose at 220° C.

Analysis.—$C_{14}H_{18}N_4O_6$. Calculated: C, 49.70; H, 5.76; N, 16.56. Found: C, 49.50; H, 5.38; N, 16.53.

(M) while cooling a solution of 9.4 g. of ethane-1,2-dithiol in 100 ml. of absolute ether with ice, it is mixed dropwise with a solution of 26.8 g. of β-chloropropionylisocyanate in 100 ml. of absolute acetone. The batch is stirred for 12 hours at room temperature, suctioned and the residue washed with ether, to yield 19 g. of colourless crystals which decompose at 206° C.

*Analysis.*—$C_{10}H_{14}N_2O_4S_2Cl_2$. Calculated: C, 33.29; H, 3.91; N, 7.75; Cl, 19.63. Found: C, 33.09; H, 3.80; N, 7.74; Cl, 19.60.

7.22 grams of the resulting product are dissolved at 40° C. in 40 ml. of dimethylformamide, cooled to 10° C. and at this temperature 5 g. of triethylene-amine are dropped in. The batch is stirred for 24 hours at room temperature, diluted with 100 ml. of ether, suctioned and the residue washed with ether and 80% methanol and recrystallized from glacial acetic acid to yield 4.8 g. of the compound of the formula (113)  $R_1$—S—$CH_2$—$CH_2$—S—$R_1$ in the form of colourless crystals which decompose at 165° C.

*Analysis.*—$C_{10}H_{12}O_4N_2S_2$. Calculated: C, 46.87; H, 4.72; N, 10.93; S, 12.51. Found: C, 47.09; H, 4.62; N, 10.73; S, 12.23.

(N) A suspension of 49.7 g. of thiodiglycol in 490 ml. of absolute ether is mixed dropwise at 0 to 5° C. with a solution of 115 g. of β-chloropropionylisocyanate in 100 ml. of absolute ether. The batch is stirred for 1 hour at room temperature, then suctioned and the residue washed with ether to yield 125 g. of colourless crystals melting at 169° C.

*Analysis.*—$C_{12}H_{18}O_6N_2SCl_2$. Calculated: C, 38.01; H, 2.13; N, 7.39; Cl, 18.70; S, 8.46. Found: C, 37.67; H, 2.51; N, 7.13; Cl, 18.60; S, 8.23.

3.9 grams of the resulting compound are dissolved at 40° C. in 20 ml. of dimethylformamide, cooled to 10° C. and at this temperature 2.5 g. of triethylamine are dropped in. The batch is stirred for 24 hours at room temperature, then mixed with 50 ml. of ether, suctioned, and the residue is washed with ether and then with water, dried under vacuum at 40° C. and recrystallized from glacial acetic acid to yield 2.1 g. of the compound of the formula (114)

$R_1$—O—$CH_2$—$CH_2$—S—$CH_2$—$CH_2$—O—$R_1$ in the form of colourless crystals which decompose at 162° C.

*Analysis.*—$C_{12}H_{16}O_6N_3S$. Calculated: C, 45.56; H, 5.10; N, 8.86; S, 10.14. Found: C, 45.63; H, 4.99; N, 8.63; S, 9.80.

(O) A solution of 6 g. of ethylenediamine in 100 ml. of absolute ether is mixed dropwise at −10° C. with a solution of 27.8 g. of β-chloropropionylisocyanate in 100 ml. of ether. The batch is stirred on for 12 hours at room temperature, suctioned and the residue washed with ether and recrystallized from glacial acetic acid to yield 19 g. of colourless crystals which decompose at 212° C.

*Analysis.*—$C_{10}H_{16}O_4N_4Cl_2$. Calculated: C, 36.71; H, 4.93; N, 17.12; Cl. 22.02. Found: C, 36.90; H, 4.96; N, 17.19; Cl, 22.11.

While vigorously stirring a solution of 3.87 g. of this compound in 40 ml. of dimethylsulphoxide, 2.5 g. of triethylamine are dropped in at 30 to 40° C. The batch is stirred for 12 hours at room temperature, then diluted with 150 ml. of ether, suctioned and washed with ether. The residue is dissolved in 40 ml. of dimethylformamide in the presence of 0.01 g. of hydroquinone at 100° C., filtered, 10 ml. of water are added to the filtrate and it is cooled. The compound of the formula (115)  $R_1$—HN—$CH_2$—$CH_2$—NH—$R_1$ which has crystallized out is suctioned off and washed with alcohol and ether and yields 2.1 g. of colourless crystals melting at 249° C.

*Analysis.*—$C_{10}H_{14}O_4N_4$. Calculated: C, 47.24; H, 5.55; N, 22.04. Found: C, 47.08; H, 5.57; N, 22.04.

(P) A mixture of 6 g. of urea, 40 ml. of acetonitrile and 26.8 g. of β-chloropropionylisocyanate is refluxed for 8 hours, then allowed to cool and cooled to 0° C. The separated crystals are washed with ether and yield 21.3 g. of colourless crystals which on recrystallization from alcohol decompose at 170° C.

*Analysis.*—$C_9H_{12}N_4O_5Cl_2$. Calculated: C, 33.04; H, 3.70; N, 17.13; Cl, 21.68. Found: C, 33.23; H, 3.42; N, 17.23; Cl, 21.30.

3 grams of this compound are dissolved at 50° C. in 20 ml. of dimethylformamide and this solution is cooled to 5 to 10° C. At this temperature 2.5 g. of triethylamine are dropped in. The batch is then stirred overnight at room temperature, then mixed with 50 ml. of ether, suctioned, washed with water and the residue dried under vacuum at 40° C., then dissolved in 20 ml. of dimethylformamide at 80 to 100° C., filtered, the filtrate is mixed with 80 ml. of methanol and suctioned and washed with methanol to yield 1.9 g. of the compound of the formula (116)  $R_1$—HN—CO—NH—$R_1$ in the form of colourless crystals which decompose at 158° C.

*Analysis.*— $C_{12}H_{10}N_4O_5$. Calculated: C, 42.52; H, 3.96; N, 22.04. Found: C, 42.31; H, 4.15; N, 21.98.

(Q) A solution of 5.9 g. of 1,6-hexanediol in 100 ml. of absolute acetonitrile is cooled with ice and mixed dropwise with a solution of 13.4 g. of β-chloropropionylisocyanate in 50 ml. of absolute ether. A white powder settles out. The batch is stirred for 12 hours at room temperature, suctioned and washed with ether to yield 19 g. of colourless crystals melting at 142° C.

*Analysis.*—$C_{14}H_{22}O_6N_2Cl_2$. Calculated: C, 43.65; H, 5.76; N, 7.27; Cl, 18.41. Found: C, 43.5; H, 5.7; N, 7.2; Cl, 18.4.

A solution of 3.85 g of the resulting compound in 20 ml. of dimethylformamide is cooled to 5° C., and at this temperature 2.5 g. of triethylamine are dropped in. The batch is stirred for 12 hours at room temperature, diluted with 50 ml. of ether, suctioned, and washed with a small quantity of ether and then with water and dried under vacuum at 40° C. The resulting compound of the formula (117)  $R_1$—O—$(CH_2)_6$—O—$R_1$ is recrystallized from glacial acetic acid. It melts at 152° C.

*Analysis.*—$C_{14}H_{20}O_6N_2$. Calculated: C, 52.84; H, 6.45; N, 8.97. Found: C, 53.79; H, 6.44; N, 8.88.

(R) A solution of 12.6 g. of pentaethyleneglycol in 100 ml. of absolute acetonitrile is cooled to −10° C. and mixed dropwise with a solution of 13.4 g. of chloropropionylisocyanate in 20 ml. of acetonitrile. During this dropwise addition the temperature is allowed to rise to 0° C., cooling is then discontinued and the batch is stirred for 12 hours at room temperature and suctioned. The residue is crystallized from 200 ml. of water and dried under vacuum at 40° C. to yield 19 g. of colourless crystals melting at 90° C.

*Analysis.*—$C_{18}H_{30}O_{10}N_2Cl_2$. Calculated: C, 42.78; H, 5.98; N, 5.54. Found. C, 42.55; H, 5.77; N, 5.52.

5 grams of the resulting compound are suspended in 100 ml. of absolute acetone and 5 ml. of hydroquinone are added. The solution is cooled to −5° C. and at this temperature a solution of 2.5 g. of triethylamine in 20 ml. of absolute acetone is dropped in. The batch is stirred for 24 hours at room temperature, suctioned and the filtrate dried under vacuum at 30° C. The residue is mixed with 60 ml. of ether containing 1 ml. of hydroquinone and filtered to yield 9 g. of the compound of the formula (118) $R_1$—O—$CH_2$—$CH_2$—(O—$CH_2$—$CH_2$)$_4$—O—$R_1$ in the form of colourless crystals melting at 66° C.

(S) A solution of 26.7 g. of chloropropionylisocyanate in 50 ml. of ether is dropped at 0 to 10° C. into a suspension of 6.2 g. of ethyleneglycol in 150 ml. of ether, whereupon immediately a white precipitate forms. The batch is stirred for 8 hours at room tempertaure, suctioned and washed with ether. The residue is recrystallized from 750 ml. of glacial acetic acid with the aid of 3 g. of active carbon to yield 20.2 g. of colourless crystals melting at 185° C.

*Analysis.*—$C_{10}H_{14}O_6N_2Cl_2$. Calculated: C, 36.49; H, 4.29; N, 8.51. Found: C, 36.45; H, 4.28; N, 8.30.

5 grams of this product are dissolved in 35 ml. of dimethylformamide at 40° C.; the solution is cooled to 25° C. and at this temperature 3.75 g. of triethylamine are dropped in. The batch is stirred for 2 hours at 40° C., filtered, the filtrate poured into 500 ml. of ether, cooled, suctioned after 2 hours and the residue is washed with water and then rinsed with a small quantity of methanol. The resulting compound of the formula (119)    $R_1$—O—$CH_2$—$CH_2$—O—$R_1$ is recrystallized from 200 ml. of methanol and yields 3.21 g. of colourless crystals melting at 181° C.

*Analysis.*—$C_{10}H_{12}O_6N_2$. Calculated: C, 46.87; H, 4.69; N, 10.37. Found: C, 46.82; H, 4.71; N, 10.27.

Example 1

A hardening solution is prepared from one of the compounds (101) to (119) and the solvent listed in the following table. This hardener solution is mixed with a 10% aqueous solution of a commercial gelatine suitable for photographic purposes at a ratio such that the mixture contains 1 to 4% of hardener, referred to dry gelatine. The mixture is immediately cast over pieces of film 18 x 24 cm., allowed to solidify for 15 minutes and then dried for 24 hours at 38° C. in circulating air having a normal moisture content. The film is then left lying open. A test series performed in this manner gave the results shown in the following table.

TABLE

| Hardener of formula | Percent of hardener referred to gelatin | Hardener Solution | M.P. after 24 hours, in °C. |
|---|---|---|---|
| (101) | 1<br>2<br>3<br>4 | 10% in water at pH 6.5 | 81<br>95<br>95<br>95 |
| (102) | 1<br>2<br>3<br>4 | do | 75<br>95<br>95<br>95 |
| (103) | 1<br>2<br>3<br>4 | do | 61<br>95<br>95<br>95 |
| (104) | 1<br>2<br>3<br>4 | do | 84<br>95<br>95<br>95 |
| (105) | 1<br>2<br>3<br>4 | do | 85<br>95<br>95<br>95 |
| (106) | 1<br>2<br>3<br>4 | do | 61<br>95<br>95<br>95 |
| (107) | 1<br>2<br>3<br>4 | do | 60<br>80<br>85<br>95 |
| (108) | 1<br>2<br>3<br>4 | 10% in 60% methanol | 78<br>95<br>95<br>95 |
| (109) | 1<br>2<br>3<br>4 | 10% in water | 65<br>90<br>95<br>95 |
| (110) | 0.25<br>0.375<br>0.5<br>0.675 | 2.5% in dimethylformamide (DMF). | 54<br>94<br>95<br>95 |
| (111) | 0.5<br>1<br>2<br>3 | 5% in water | 40<br>42<br>80<br>95 |
| (112) | 0.5<br>1<br>2<br>4 | 5% in dimethylformamide | 44<br>78<br>86<br>91 |

TABLE—Continued

| Hardener of formula | Percent of hardener referred to gelatin | Hardener Solution | M.P. after 24 hours, in °C. |
|---|---|---|---|
| (113) | 0.25<br>0.5<br>1 | 10% in dimethylformamide | 53<br>79<br>91 |
| (114) | 0.25<br>0.5<br>1 | do | 54<br>72<br>90 |
| (115) | 0.5<br>1<br>4 | 2.5% in dimethylformamide | 90<br>90<br>95 |
| (116) | 4<br>5 | 5% in dimethylformamide | 66<br>81 |
| (117) | 0.4<br>0.8<br>1.2<br>1.6 | 5% in methanol | 42<br>57<br>95<br>95 |
| (118) | 0.1<br>0.2<br>0.4<br>0.6 | 10% in water | 46<br>67<br>95<br>95 |
| (119) | 0.1<br>0.2<br>0.4<br>0.6 | 10% in dimethylformamide | 85<br>90<br>95<br>95 |

Example 2

A gelatine solution of 10% strength, dyed with the blue azo dye obtained by bilateral coupling of tetrazotized 1,4-diamino-2,5-dimethoxybenzene with 1-acetylamino-8-hydroxy-naphthalene-3,6-disulphonic acid, is prepared and 10 ml. each of this solution is cast over two plates of glass 1 and 2, measuring 13 x 18 cm., and the plates are dried. The glass plate 1 is then coated with a 10% gelatine solution dyed with the red azo dye obtained by condensing 2 mols of 7-amino-8-(4'-aminophenylazo)-hydroxynaphthalene-3,2'-disulphonic acid with 1 mol of thiophene-2,5-dicarboxylic acid chloride, and containing the hardener of the formula

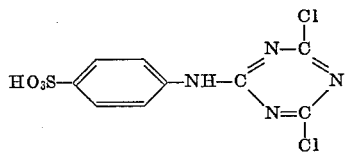

A red dyed gelatine solution, which, however, contains 2.4 ml. of a 10% solution (=0.39 milimol) of the compound of the formula 103, is cast over glass plate 2.

The plates 1 and 2 are dried at an ambient temperature of 40° C. and then stored for 40 hours at room temperature. Plates 1 and 2 are then immersed in water and the water is slowly heated, whereupon on plate 1 the layers begin to melt uniformly at 40 to 45° C., whereas with plate 2 the layer dyed red slowly detaches itself at this temperature from the melting blue layer and floats on the water in the form of flocks.

I claim:

1. A process for hardening gelatine, which comprises reacting gelatine with an acrylic acid derivative of the formula

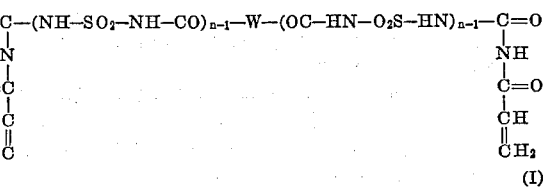

in which when $n=1$, W represents a member selected from the group consisting of a —NH—$(CO)_{s-1}$—NH— group and a —X—Y—Z— group, and in which when $n=2$ W represents a —X—Y—Z— group, in which X and Z each represents a member selected from the group consisting of an oxygen atom, a sulfur atom, an —NH— group and an —NH—CO— group bound through its carbon atom to Y; Y represents a member selected from the group consisting of the radicals —$(CH_2)_m$—, —$CH_2$—$CH_2$— [O — $CH_2$ — $CH_2]_q$—, —$(CH_2)_r$—O—

$(CH_2)_r$— and —$(CH_2)_r$—S—$(CH_2)_r$—, $n$, $m$, $q$, $r$ and $s$ are integers, $n$ and $s$ being at most 2, $m$ at most 14, $q$ being 2 to 4 and $r$ at most 4.

2. A process for hardening gelatine according to claim 1, which comprises reacting gelatine with an acrylic acid derivative of the formula

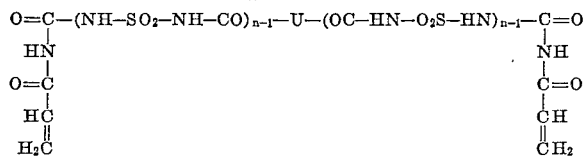

in which when $n=1$, U represents a member selected from the group consisting of the radicals —O—Y—O—, —X—$(CH_2)_m$—Z—, —NHNH— and —NH—CO—NH—, and in which when $n=2$, U represents a —O—Y—O— or —X—$(CH_2)_m$—Z— radical, in which Y is a member selected from the groups consisting of the radicals —$(CH_2)_m$—, —$CH_2$—$CH_2$—[O—$CH_2CH_2$]$_q$—, —$(CH_2)_2$—O—$(CH_2)_r$— and —$(CH_2)_r$—S—$(CH_2)_r$—, X and Z each represents a member selected from the group consisting of an oxygen atom, a sulfur atom, an —NH— group and an —NHCO— group linked to Y through its carbon atom, and $n$, $m$, $q$ and $r$ are integers, $n$ being at most 2, $m$ at most 14, $q$ being 2 to 4 and $r$ at most 4.

3. A process for hardening gelatine according to claim 1, which comprises reacting gelatine with an acrylic acid derivative of the formula $O=C$-$(NH$-$SO_2$-$NH$-$CO)_{n-1}$-$O$-$Y_1$-$O$-$(OC$-$HN$-$O_2S$-$HN)_{n-1}$-$C=O$
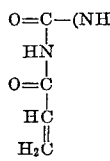

in which $Y_1$ represents a member selected from the group consisting of the radicals —$(CH_2)_{m1}$—, —$CH_2$—$CH_2$—[O—$CH_2$—$CH_2$]$_q$—, —$(CH_2)_{r1}$—O—$(CH_2)_{r1}$— and —$(CH_2)_{r1}$—S—$(CH_2)_{r1}$—, in which $n$, $m$, $q$ and $r_1$ are integers, $n$ being at most 2, $m_1=2$ to 12, $q$ and $r_1=2$ to 4.

4. A process for hardening gelatine according to claim 1, which comprises reacting gelatine with an acrylic acid derivative of the formula $H_2C=HC$— $OC$—$NH$—$OC$—$O$—$Y_2$—$O$—$CO$—$HN$— $CO$—$CH=CH_2$ in which $Y_2$ represents a member selected from the group [O—$CH_2$—$CH_2$]$_{q1}$— and —$CH_2$—$CH_2$—S—$CH_2$—$CH_2$—, in which $q_1$ is an integer of 1 to 4 and $m_1$ of 2 to 12.

5. A process for hardening gelatine according to claim 1, which comprises reacting gelatine with an acrylic acid derivative of the formula

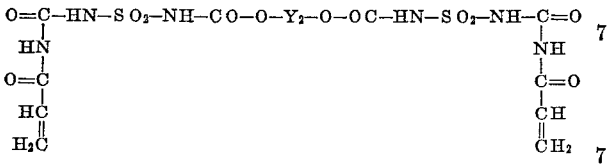

in which $Y_2$ represents a member selected from the group consisting of the radicals —$(CH_2)_{m1}$—, —$CH_2$—$CH_2$—[O—$CH_2CH_2$]$_{q1}$— and —$CH_2$—$CH_2$—S—$CH_2CH_2$—, in which $q_1$ is an integer of 1 to 4 and $m_1$ of 2 to 12.

6. A process for hardening gelatine according to claim 1, which comprises reacting gelatine with an acrylic acid derivative of the Formula I given in claim 1, in which Y is an aliphatic chain containing at least 6 carbon atoms.

7. A process for hardening gelatine according to claim 1, which comprises reacting gelatine with an acrylic acid derivative of the formula

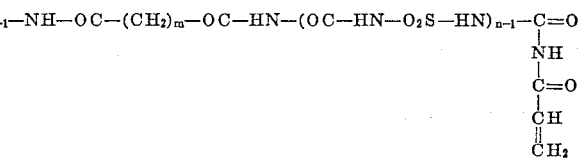

in which $n$ is 1 or 2 and $m$ an integer of from 1 to 14.

8. A process for hardening gelatine according to claim 1, which comprises reacting gelatine with an acrylic acid derivative of the formula

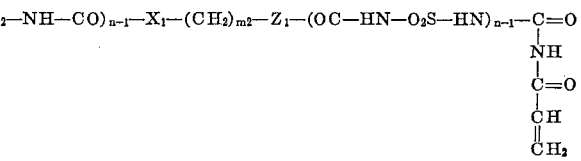

in which $X_1$ represents a member selected from the group consisting of an oxygen atom, a sulfur atom and an —NH— group, $Z_1$ represents an oxygen or a sulfur atom, $m_2$ is 2 to 4 and $n$ is 1 or 2.

9. A process for hardening gelatine according to claim 1, which comprises reacting gelatine with an acrylic acid derivative of the formula

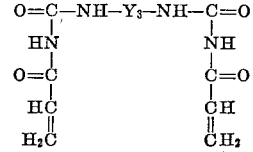

in which $Y_3$ represents a member selected from the group consisting of a —CO— and a —$(CH_2)_{m3-1}$— group, in which $m_3$ is an integer of from 1 to 13.

10. A process for hardening gelatine according to claim 1, which comprises reacting gelatine with an acrylic acid derivative of the formula

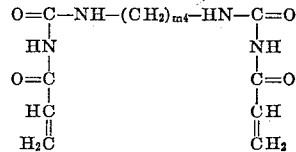

in which $m_4$ is an integer from 2 to 10.

References Cited

UNITED STATES PATENTS

| | | | |
|---|---|---|---|
| 2,486,190 | 10/1949 | Minsk et al. | 260—89.7 |
| 2,548,520 | 4/1951 | Damschroder et al. | 260—8 |
| 2,852,382 | 9/1958 | Illingsworth et al. | 96—97 |
| 2,852,386 | 9/1958 | Tong | 96—114 |
| 3,272,640 | 9/1966 | Geurden | 106—131 |

WILLIAM H. SHORT, Primary Examiner

H. SCHAIN, Assistant Examiner

U.S. Cl. X.R.

96—111